United States Patent [19]

Stone

[11] Patent Number: 4,612,176

[45] Date of Patent: * Sep. 16, 1986

[54] PROCESS FOR TREATING METAL HALIDES AND ORGANO SUBSTITUTED METAL HALIDES WITH METAL RECOVERY

[76] Inventor: Carroll E. Stone, 2250 Roanoke Rd., San Marino, Calif. 91108

[*] Notice: The portion of the term of this patent subsequent to Apr. 16, 2002 has been disclaimed.

[21] Appl. No.: 608,486

[22] Filed: May 9, 1984
(Under 37 CFR 1.47)

Related U.S. Application Data

[63] Continuation-in-part of Ser. No. 493,362, May 10, 1983, Pat. No. 4,511,545.

[51] Int. Cl.[4] .................. B01D 53/34; C03C 15/00
[52] U.S. Cl. .................. 423/240; 423/245; 423/481; 423/612; 423/618; 65/30.1
[58] Field of Search .................. 65/30.1, 60.51; 423/245 R, 611, 612, 618, 481, 240 S, 240 R; 55/71, 72

[56] References Cited

U.S. PATENT DOCUMENTS

| | | | |
|---|---|---|---|
| 2,346,604 | 4/1944 | Pechukas | 423/240 R |
| 2,732,310 | 1/1956 | Miller . | |
| 2,945,748 | 7/1960 | Magill . | |
| 3,256,062 | 6/1966 | Wylegala | 423/240 R |
| 3,561,940 | 2/1971 | Scholes . | |
| 3,615,163 | 10/1971 | Bizozowski | 423/240 R |
| 3,770,385 | 11/1973 | Grey et al. | 55/71 |
| 3,789,109 | 1/1974 | Lyon et al. | 423/481 |
| 3,919,391 | 11/1975 | Scholes et al. | 423/240 R |
| 3,948,608 | 4/1976 | Weir, Jr. | 261/118 |
| 3,956,532 | 5/1976 | Russell | 423/237 |
| 4,039,307 | 8/1977 | Bondor | 261/125 |
| 4,325,922 | 4/1982 | Bryant | 423/240 |
| 4,406,843 | 9/1983 | Nakamura et al. | 261/22 |

Primary Examiner—John Doll
Assistant Examiner—Jeffrey E. Russel
Attorney, Agent, or Firm—Lyon & Lyon

[57] ABSTRACT

A process and apparatus for treating a gas containing a metal halide or an organo substituted metal halide which is drawn into a recovery chamber and is decomposed to a metal precipitate and hydrogen halide by reaction with a warm water spray. Gaseous hydrogen halide is then subjected to a cold water spray to reduce the hydrogen halide gas to an acid which is diluted and discarded as an effluent. The treated gas which is finally discarded to the environment contains substantially no metal halides or organo substituted metal halides and only a minimal concentration of hydrogen halide gas. Metal recovery is enhanced by controlling the pH of the metal oxide and the collected warm water spray and the metal precipitate which is collected in the recovery chamber.

73 Claims, 3 Drawing Figures

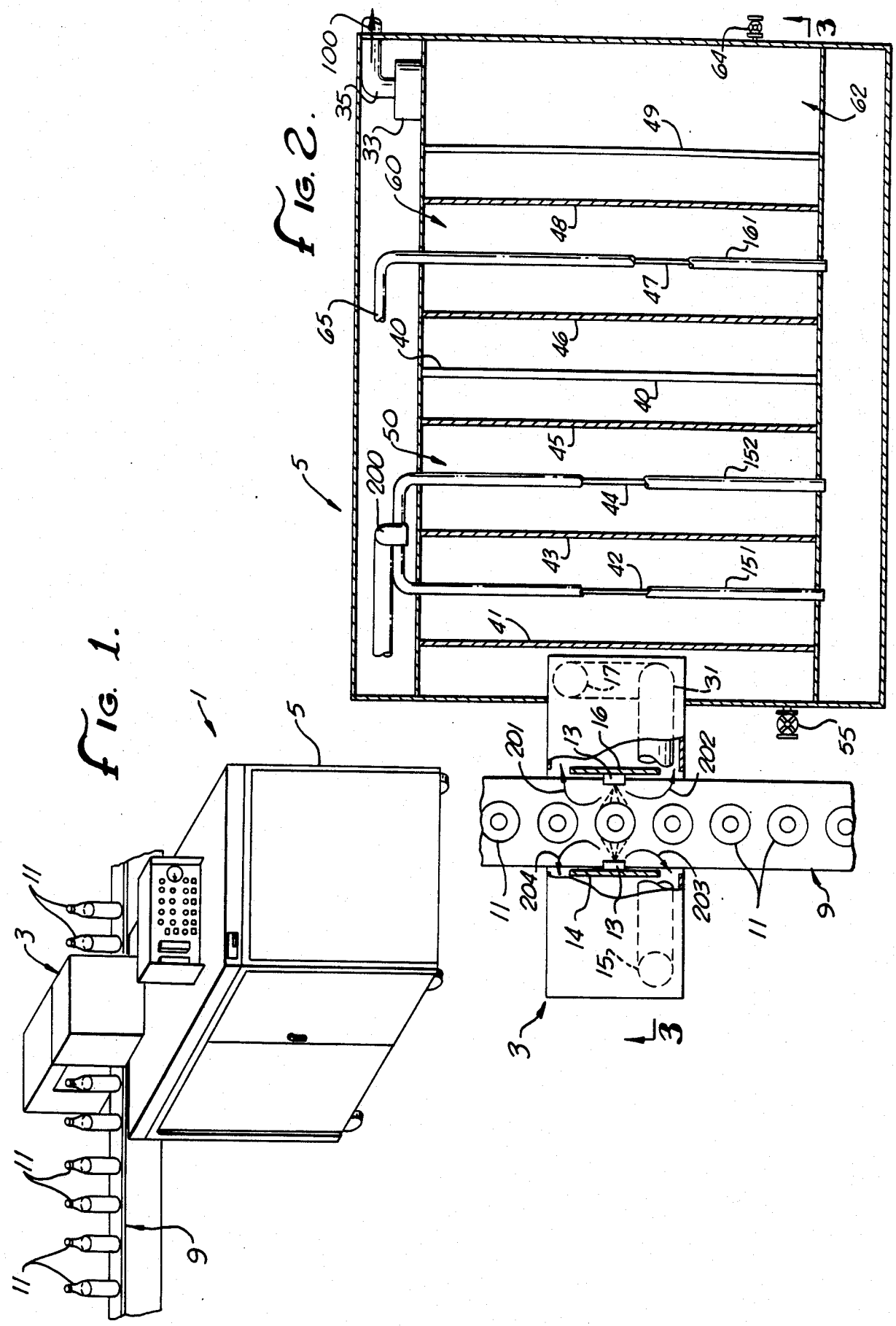

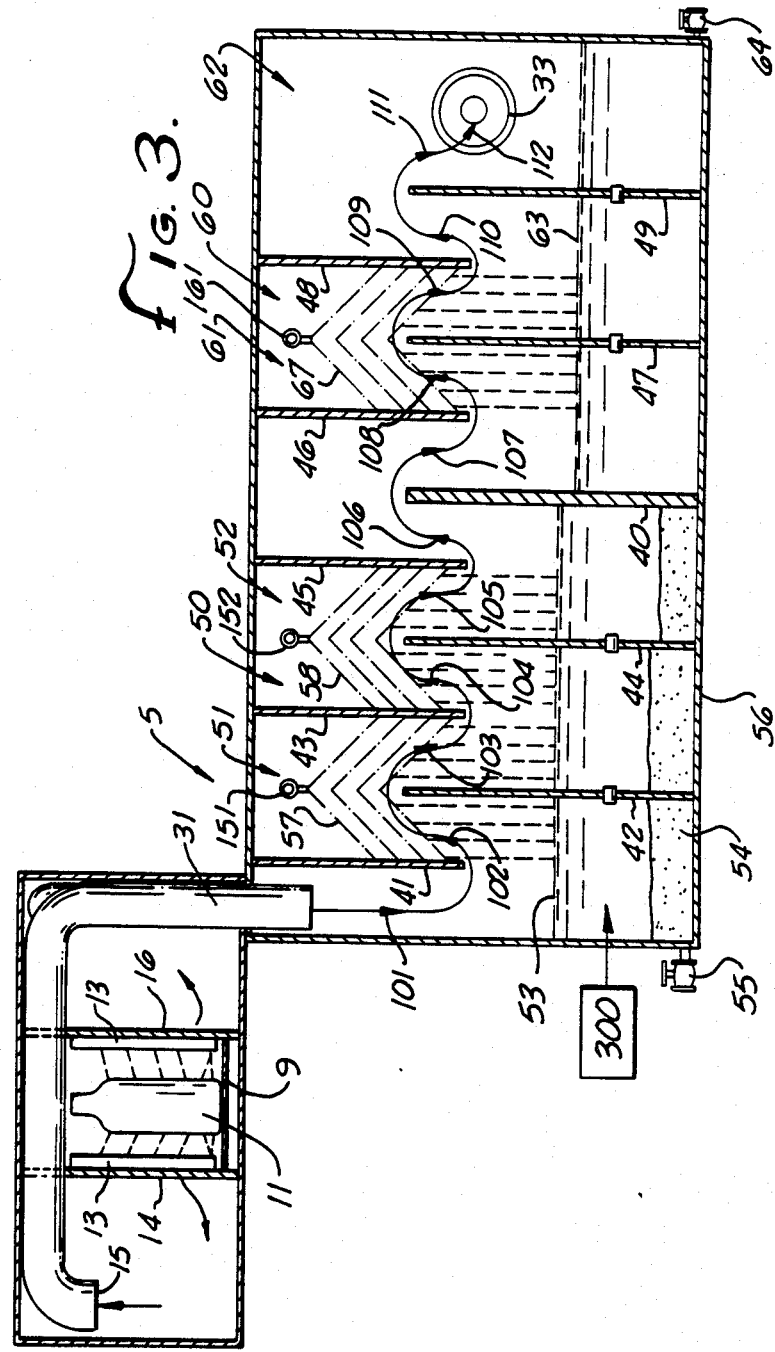

PROCESS FOR TREATING METAL HALIDES AND ORGANO SUBSTITUTED METAL HALIDES WITH METAL RECOVERY

CROSS-REFERENCE TO RELATED APPLICATIONS

The present application is a continuation-in-part of Ser. No. 493,362, filed. May 10, 1983, U.S. Pat. No. 4,511,545, issued Apr. 16, 1985, entitled "Process for Treating Overspray Gas from Glass Coating Operation with Metal Recovery".

BACKGROUND OF THE INVENTION

1. Field of The Invention

The field of the present invention relates generally to an apparatus and processes which employ pollution abatement techniques to treat a gas containing metal halides or organo substituted metal halides and recover the metal in a reusable form. In a specific application, excess coating materials generated by a coating apparatus utilized in glass manufacture are treated.

2. Description of the Prior Art

Glass surfaces are found in a multitude of objects, including glass containers and bottles. However, when freshly formed glass surfaces are moved over one another at the slightest contact pressure, visible abrasions will be formed. Since it has long been recognized that abrasions reduce the potential strength of a glass container, and glass containers are handled in filling lines at very high rates in conditions where the glass containers will often come into contact with each other, glass manufacturers have sought means to protect glass surfaces.

It has been found that glass may advantageously be coated utilizing hot-end coating operations between a glass forming machine and a lehr in which the formed glass is annealed. In such a process, a metal oxide coating is formed on the hot glass surface. In particular, it has been found that metal oxide coatings are useful in preventing abrasions.

Metal oxide coatings may be formed during hot-end coating operations by treating hot glass surfaces with metal halides or organo substituted metal halides. Thus, by way of example only, stannic chloride vapor has been utilized in such operations, as is more fully described in U.S. Pat. No. 3,561,940, the disclosure of which is specifically incorporated herein by reference. Another example of a metal halide now in commercial use is titanium tetrachloride. Suitable examples of organo substituted metallic halides include tin halides, such as diisopropyl tin dibromide, trimethyl tin chloride, tripropyl tin chloride and other compounds noted in U.S. Pat. No. 3,956,532, the disclosure of which is specifically incorporated herein by reference. However, conventional coating operations require an excess or overspray of the coating material in order to achieve a desired coating thickness. The amount of overspray will not only affect the cost of the materials needed to coat a given quantity of glass objects, but it will also contribute to the amount of coating materials which are introduced into the environment surrounding the coating apparatus.

It is suspected that metal halides and organo substituted metal halides pose a health hazard to industrial workers who are continually exposed to relatively low levels of these materials over a long period of time. Metallic halide compounds and organo substituted metallic halide compounds will decompose to form a strong acid or a hydrogen halide gas as well as a metallic oxide upon contact with sufficient moisture or heat. Thus, metallic halides and organo substituted metallic halides pose health risks not only due to their metallic content, but also due to their corrosive properties. Additionally, the same corrosive properties which pose health hazards will also lead to property damage and environmental concerns if the metallic halides and organo substituted metallic halides are not removed from waste gases.

Despite the above-noted problems, conventional apparatus and methods of coating have taken few preventive measures to reduce the amount of overspray which is discharged outside of the coating apparatus. As an example, previous methods of coating have often relied upon elevated exhaust ducts to reduce the concentration of excess coating vapors released to the environment. Such exhaust ducts create an elevated plume which is eventually distributed over a large area. While such devices decrease the concentration of metallic coating materials which are found in a small unit of surrounding air, such as a cubic meter, the metallic coating materials are still emitted to the environment. Thus, there exists a need for an effective means for removing metal halides and organo substituted metal halides from the environment when such compounds are discharged in a waste gas from any industrial application, one example of which is hot-end metallic glass coating operations.

SUMMARY OF THE INVENTION

In the present invention, waste gas containing metal halides or organo substituted metal halides is subjected to a treatment process in which the metallic halides and the organo substituted metallic halides are washed with a hot water spray to precipitate the metal. In another aspect of the present invention, the recovery of the metal is enhanced by controlling the pH of the solution collected in the hot water spray compartment. In still another aspect of the present invention, the gaseous by-products, generated by the decomposition of the metal halides or organo substituted metal halides during the hot water wash, are treated with a cold water spray. While the present invention discloses processes for the treatment of metal halides and organo substituted metal halides, another aspect of the present invention applies these processes to the treatment of an overspray discharge which is generated during hot-end metallic glass coating operations.

In a particular application of the present invention when a glass surface is coated in accordance with the present invention, substantially all of the metal not utilized to form a coating on the glass is recovered as a recyclable by-product, thereby reducing the cost of coating a glass surface. Additionally, the discharge of metal halides and organo substituted metal halides into the environment is greatly reduced. The reduction of metal halide and organo substituted metal halide discharge reduces property and environmental damage caused by the corrosive nature of such compounds. Additionally, health hazards associated with the constant exposure of workers to background levels of metal halides and organo substituted metal halides are greatly reduced.

When a cold water wash is utilized in accordance with the present invention, the by-products of the decomposition of metal halides and organo substituted metal halides may be safely discarded. Thus, metal halides and organo substituted metal halides are treated without generating hazardous wastes which are expensive to safely dispose. In addition, the present invention does not require any chemicals, other than water, to treat the excess glass coating spray. However, through control of the pH of the solution collected in the hot spray compartment, the hot water may be continually recycled in a closed system and the metal recovery is enhanced.

Accordingly, it is a primary object of the present invention to provide an apparatus and process for treating a gas containing a metal halide or an organo substituted metal halide.

This and further objects and advantages will be apparent to those skilled in the art in connection with the drawings and the detailed description of the preferred embodiment set forth below.

BRIEF DESCRIPTION OF THE DRAWINGS

FIG. 1 is an environmental view of a preferred embodiment of an apparatus according to the present invention;

FIG. 2 is a partial cut-away top view of FIG. 1; and

FIG. 3 is a cross section taken along line 3—3 of FIG. 2.

DETAILED DESCRIPTION OF A PREFERRED EMBODIMENT

In the present invention, metal halides and organo substituted metal halides are treated to recover a metal precipitate. While the present invention is particularly applicable to metal halides and organo substituted metal halides existing in a gaseous state, it is also applicable to airborne metal halides and organo substituted metal halides which might exist in a particulate or aqueous state. Further, while any gas containing a metal halide or organo substituted metal halide may be treated according to the present invention, the present invention has been found to be especially well suited to glass coating processes. Accordingly, by way of example only, a glass coating apparatus employing the processes of the present invention is described hereinafter. However, by applying the teachings of the following description, one of ordinary skill in the art could apply the processes of the present invention to other industrial applications.

A preferred embodiment of a coating apparatus with metal recovery according to the present invention, generally designated as 1, is depicted in FIG. 1. The coating apparatus 1 consists of a coating chamber which also serves as an overspray collector, generally designated as 3, a recovery chamber, generally designated as 5, and a conveyor, generally designated as 9.

As shown in FIG. 2, the conveyor 9 moves through coating chamber 3 carrying glass objects 11. While glass objects 11 have been depicted as bottles, any object having a glass surface may be treated in a similar fashion.

The coating chamber 3 has two moveable walls, 14 and 16, which are substantially parallel to the path the objects 11 pass through the coating chamber 3 on the conveyor 9. The walls 14 and 16 may be moved in a direction perpendicular to the conveyor 9 so as to adjust the distance between the objects 11 being coated and the nozzles 13 which are affixed to the walls 14 and 16. As shown in FIGS. 2 and 3, in which like-numbered elements are identical, five nozzles are vertically aligned in the center of the walls 14 and 16. The tips of the nozzles are a distance of approximately one inch from the glass surface to be coated. A duct 15 is located behind wall 14 relative to the conveyor 9 while a duct 17 is located behind wall 16 relative to the conveyor 9. The ducts 15 and 17 are located on opposite sides of a plane which may formed through the centers of the nozzles 13. The ducts 15 and 17 are connected to a central duct 31 which forms an overspray gas inlet leading into recovery chamber 5. Alternatively, each duct 15 and 17 could lead into the recovery chamber 5.

The recovery chamber is divided into a hot spray compartment, generally designated as 50, and a cold spray compartment, generally designated as 60, by a passage formed above insulator 40. Baffles 41, 42, 43, 44 and 45 divide the hot spray compartment 50 into a first hot spray zone, generally designated as 51, and a second hot spray zone, generally designated as 52, while baffles 46, 47 and 48 divide the cold spray compartment 60 into a cold spray zone, generally designated as 61, and a discharge zone, generally designated as 62. An additional baffle 49 is provided in the discharge zone 62 to help control the exit velocity, as well as to decrease the hydrogen halide content of the discharge 100 through exhaust duct 35 of fan 33, all of which will be described in greater detail below.

A first set of hot water spray nozzles 151, shown in FIG. 3, produce a hot water spray 57 in the first hot spray zone 51 while a second set of hot water spray nozzles 152 produce a hot water spray 58 in the second hot spray zone 52. The hot water 53 is recirculated through spray nozzles 151 and 152 and maintained at an elevated temperature through a closed recirculation system 200 which supplies the spray nozzles with a source of hot water 53.

The design of a recirculation system, which may include a make-up water source, a heater, pumps and the like, is deemed to be well within the capability of one skilled in the art. Therefore, a detailed description of such a system has been omitted so as to facilitate an understanding of the novel aspects of the present invention. Additionally, while the hot spray compartment 50 has been described as having a first spray zone 51 and a second spray zone 52, the design of such spray zones may be modified so long as a sufficient spray zone is attained in which substantially all of the metal halide and organo substituted metal halide is decomposed. In a similar manner, while both the first and the second set of hot water spray nozzles 151 and 152 form a hot water sprayer, the design of such a hot water sprayer may be modified without departing from the scope of the present invention.

A basic chemical may be added to the recirculation system or directly to the hot spray compartment 50 which may function as a water collector or a reservoir of hot water for a closed cycle recirculation system. The quantity of the basic chemical should be enough to maintain the water 53 within an effective pH range such that a bottoms portion containing the metal precipitate will form. The design of the equipment for introduction of the base chemical, which may be introduced as a solid or a liquid into the reservoir or the recirculation system, is deemed to be well within the capability of one skilled in the art. The choice of an appropriate chemical, such as soda ash, for example, is also deemed to be well within the capability of one skilled in the art.

A set of cold water spray nozzles 161 form a cold sprayer which produces a cold water spray 67 in the cold spray zone 61. The cold water spray 67 is collected in a cold water effluent 63, which is removed from the recovery chamber 5 by drain 64. Fresh cold water is supplied to the cold water spray nozzles by a pipe 65 which may be directly connected to an incoming source of water supplied by a municipal water service.

During operation of the coating apparatus 1, the conveyor 9 carries objects 11 through coating chamber 3. The nozzles 13 spray a metal coating toward the objects 11, and the metal coating is dispersed over the glass surface of the objects 11 to react and form a relatively uniform layer of metal oxide having the desired thickness. The metal coating, which may be a metal halide or an organo substituted metal halide, may exist in a gaseous state or may exist as an airborne particle or liquid. The excess metal coating is drawn into ducts 15 and 17 around walls 14 and 16, as shown by arrows 201 through 204 in FIG. 2.

As the overspray is drawn into the recovery chamber 5 by a circulation means, such as a partial vacuum, it initially follows a gas circulation path shown by arrows 101 and 102, shown in FIG. 3, so that it passes between baffle 41 and hot water 53. It then enters the first hot spray zone 51. When the overspray passes through hot water spray 57, the metal halide or organo substituted metal halide is reacted to form a metal oxide, a hydrogen halide and a hot water treated gas. The metal xoide forms a slurry 54 at the bottom 56 of the hot spray compartment 50 which functions as a water collector from which the slurry may be withdrawn by slurry drain 55. The hydrogen halide may exist as a gaseous portion of the hot water treated gas or it may be collected in the hot water collection device 56 in an aqueous portion. However, it is preferable that operating conditions be adjusted such that the lengths of the baffles 41 through 49 be sufficient so as to force the travelling gas to go underneath baffles 41, 43, 45, 46 and 48 while going over baffles 42, 44, 47, 49 and insulator 40. An example of a gas flow path through the recovery chamber is depicted sequentially in FIG. 3 by arrows 101 through 112.

The invention will be further illustrated in the example that follows wherein stannic chloride, a compound consisting of tin and chloride with the molecular formula $SnCl_4$, has been chosen as a coating compound.

When the glass object 11 leaves a glass forming machine, the temperature of the glass entering the coating apparatus is between 900° to 1500° F., preferably within the 950° to 1000° F. range. As $SnCl_4$ is sprayed onto the glass, the $SnCl_4$ penetrates the glass structure to form a layer of tin oxide. The overspray, which may contain up to 50% of the $SnCl_4$ sprayed, is then drawn into the hot water sprays 57 and 58 which are maintained at a temperature sufficient to decompose the $SnCl_4$. While it has been found that this temperature should be greater than approximately 160° F., higher temperatures have been found to produce better results. The $SnCl_4$ is decomposed to form a metal precipitate and hydrogen chloride. In order to prevent the hot water 53 from becoming increasingly acidic, an effective amount of soda ash may be diluted and continually added to the hot water 53 through a metering system, which has been depicted generally as 300, so as to maintain the hot water 53 at a pH of between about 6 to about 9 and allow the hot water 53 to be recirculated through the recirculation system 200 without damage to the system.

It has been found that approximately 10% to 25% more tin precipitate can be recovered from a bottoms portion maintained at an effective pH range of from about 6 to about 9. When the bottoms portion is maintained at a lower and more acidic pH, more of the tin precipitate tends to stay in a type of colloidal liquid state rather than settling out as a bottoms portion or slurry. It is suspected that the colloidal state is caused by agitation or turbidity generated by the hot water recirculation system. The effective pH range will minimize the concentration of the metal precipitate which is maintained in such a state. The upper limit of the effective pH range for the treatment of $SnCl_4$ has been found to be less than about 9 since the tin precipitate apparently forms a salt at higher pH values. After the hot water wash, the hydrogen chloride gas is then subjected to a cold water spray 67 which has a maximum temperature of less than approximately 90° F. The temperature of the cold water spray 67 is set within an effective range in which substantially all of the hydrogen halide gas will react with the cold water spray 67 to form an acid which can be collected in a cold water effluent. The resultant cold water effluent 63 discharged from the system is at a pH of 6.3 with a tin concentration less than 0.0002 milligrams per milliliter. The hydrogen chloride gas concentration in the exhaust 100 is less than 5.0 parts per million. The tin concentration outside of the apparatus is less than 1.0 milligrams per cubic meter.

Having fully described the present invention, it will be apparent from the above description and drawings that various modifications in the specific compositions, procedures and apparatus described may be made within the scope of the invention. Therefore, the invention is not intended to be limited to the particular designs, procedures and formulations except as may be required by the lawful scope of the following claims.

What is claimed is:

1. A process for recovering metal from a gas containing a metal halide, said process comprising the steps of
    passing the gas to a hot spray compartment;
    spraying the gas with a hot water spray to form a hot water treated gas, a metal precipitate and a hydrogen halide;
    collecting the metal precipitate and the hot water spray in a hot water collection device;
    separating the metal precipitate from the hot water spray; and
    passing the hot water treated gas together with substantially all of the hydrogen halide in the gaseous phase out of the hot spray compartment.

2. A process as recited in claim 1, wherein the hot water spray is at a temperature greater than about 160° F.

3. A process as recited in claim 1, wherein substantially all of the metal halide in the gas is decomposed.

4. A process as recited in claim 1, wherein an aqueous portion of hydrogen halide is formed in the hot spray compartment and collected with the metal precipitate and the hot water spray.

5. A process as recited in claim 4, wherein a basic compound is added to the hot water collection device.

6. A process as recited in claim 5, wherein the hot water collection device is maintained at a pH between about 6 to about 9.

7. A process as recited in claim 1, wherein the metal halide contains tin.

8. A process as recited in claim 7, wherein the metal halide is comprised of stannic chloride.

9. A process as recited in claim 1, wherein the metal halide contained in the gas exists in a gaseous state.

10. A process as recited in claim 1, wherein the metal halide contained in the gaseous portion exists in an airborne particulate state.

11. A process as recited in claim 1, wherein the metal halide contained in the gas exists in an airborne aqueous state.

12. A process for recovering metal from a gas containing an organo substituted metal halide, said process comprising the steps of:
passing the gas to a hot spray compartment;
spraying the gas with a hot water spray to form a hot water treated gas, a metal precipitate and a hydrogen halide;
collecting the metal precipitate and the hot water spray in a hot water collection device;
separating the metal precipitate from the hot water spray; and
passing the hot water treated gas together with substantially all of the hydrogen halide in the gaseous phase out of the hot spray compartment.

13. A process as recited in claim 12, wherein the hot water spray is at a temperature greater than about 160° F.

14. A process as recited in claim 12, wherein substantially all of the organo substituted metal halide in the gas is decomposed.

15. A process as recited in claim 12, wherein an aqueous portion of hydrogen halide is formed in the hot spray compartment and collected with the metal precipitate and the hot water spray.

16. A process as recited in claim 15, wherein a basic compound is added to the hot water collection device.

17. A process as recited in claim 16, wherein the hot water collection device is maintained at a pH between about 6 to about 9.

18. A process as recited in claim 12, wherein the organo substituted metal halide contains tin.

19. A process as recited in claim 12, wherein the organo substituted metal halide contained in the gas exists in a gaseous state.

20. A process as recited in claim 12, wherein the organo substituted metal halide contained in the gas exists in an airborne particulate state.

21. A process as recited in claim 12, wherein the organo substituted metal halide contained in the gas exists in an airborne aqueous state.

22. A process for recovering metal from a gas containing a metal halide, said process comprising the steps of:
passing the gas to a hot spray compartment;
spraying the gas with a hot water spray to form a metal precipitate and a hot water treated gas containing a hydrogen halide in a gaseous portion;
collecting the metal precipitate and the hot water spray in a hot water collection device;
passing the hot water treated gas to a cold spray compartment;
spraying the hot water treated gas with a cold water spray to form an aqueous acid from the hydrogen halide in the gaseous portion;
collecting the aqueous acid and the cold water spray to form a cold water effluent; and
discharging the hot water treated gas from the cold spray compartment in an exhaust.

23. A process as recited in claim 22, wherein the hot water is at a temperature greater than about 160° F.

24. A process as recited in claim 22, wherein the cold spray is at a temperature less than about 90° F.

25. A process as recited in claim 22, wherein the exhaust has a concentration of hydrogen halide gas which is lower than about 5.0 parts per million.

26. A process as recited in claim 22, wherein the cold water effluent discharge from the cold spray compartment has a pH above about 6.0.

27. A process as recited in claim 22, wherein the exhaust has a tin concentration of less than about 1.0 milligrams of tin per cubic meter.

28. A process as recited in claim 22, wherein substantially all of the metal halide in the gas is decomposed.

29. A process as recited in claim 22, wherein substantially all of the hydrogen halide is passed from the hot spray compartment as a gaseous portion.

30. A process as recited in claim 22, wherein an aqueous portion of hydrogen halide is formed in the hot spray compartment and collected with the metal precipitate and the hot water spray.

31. A process as recited in claim 30, wherein a basic compound is added to the hot water collection device.

32. A process as recited in claim 31, wherein the hot water collection device is maintained at a pH between about 6 to about 9.

33. A process as recited in claim 32, further comprising the steps of:
discharging the cold water effluent from the cold spray compartment; and
recycling the hot water in the hot water collector to the hot water spray.

34. A process as recited in claim 22, wherein the metal halide contains tin.

35. A process as recited in claim 34, wherein the metal halide is comprised of stannic chloride.

36. A process as recited in claim 22, wherein the metal halide contained in the gas exists in a gaseous state.

37. A process as recited in claim 22, wherein the metal halide contained in the gas exists in an airborne particulate state.

38. A process as recited in claim 22, wherein the metal halide contained in the gas exists in an airborne aqueous state.

39. A process for recovering metal from a gas containing an organo substituted metal halide, said process comprising the steps of:
passing the gas to a hot spray compartment;
spraying the gas with a hot water spray to form a metal precipitate and a hot water treated gas containing a hydrogen halide in a gaseous portion;
collecting the metal precipitate and the hot water spray in a hot water collection device;
passing the hot water treated gas to a cold spray compartment;
spraying the hot water treated gas with a cold water spray to form an aqueous acid from the hydrogen halide in the gaseous portion;
collecting the aqueous acid and the cold water spray to form a cold water effluent; and
discharging the hot water treated gas from the cold spray compartment in an exhaust.

40. A process as recited in claim 39, wherein the hot water is at a temperature greater than about 160° F.

41. A process as recited in claim 39, wherein the cold spray is at a temperature less than about 90° F.

42. A process as recited in claim 39, wherein the exhaust has a concentration of hydrogen halide gas which is lower than about 5.0 parts per million.

43. A process as recited in claim 39, wherein the cold water effluent discharge from the cold spray compartment has a pH above about 6.0.

44. A process as recited in claim 39, wherein the exhaust has a tin concentration of less than about 1.0 milligrams per cubic meter.

45. A process as recited in claim 39, wherein substantially all of the organo substituted metal halide in the gas is decomposed.

46. A process as recited in claim 39, wherein substantially all of the hydrogen halide is passed from the hot spray compartment as a gaseous portion.

47. A process as recited in claim 39, wherein an aqueous portion of hydrogen halide is formed in the hot spray compartment and collected with the metal precipitate and the hot water spray.

48. A process as recited in claim 47, wherein a basic compound is added to the hot water collection device.

49. A process as recited in claim 48, wherein the hot water collection device is maintained at a pH between about 6 to about 9.

50. A process as recited in claim 49, further comprising the steps of:
    discharging the cold water effluent from the cold spray compartment; and
    recycling the hot water in the hot water collector to the hot water spray.

51. A process as recited in claim 39, wherein the organo substituted metal halide contains tin.

52. A process as recited in claim 39, wherein the organo substituted metal halide contained in the gas exists in a gaseous state.

53. A process as recited in claim 39, wherein the organo substituted metal halide contained in the gas exists in an airborne particulate state.

54. A process as recited in claim 39, wherein the organo substituted metal halide contained in the gas exists in an airborne aqueous state.

55. A process for treating an overspray gas generated during a hot-end glass coating operation utilizing a metal halide, said process comprising the steps of:
    collecting the overspray gas;
    passing the overspray gas to a hot spray compartment;
    spraying the overspray gas with a hot water spray to decompose the metal halide to a metal precipitate and a hydrogen halide;
    collecting the metal precipitate and the hot water spray in a warm water collector;
    passing a gaseous portion of the hydrogen halide to a cold spray compartment;
    spraying the gaseous portion of hydrogen halide with a cold water spray to form an acid;
    collecting the acid to form a cold water effluent; and
    discharging an exhaust from the cold spray compartment.

56. A process as recited in claim 55, wherein the hot water is at a temperature greater than about 160° F.

57. A process as recited in claim 56, wherein the cold water spray is at a temperature less than about 90° F.

58. A process as recited in claim 57, wherein the metal halide comprises stannic chloride.

59. A process as recited in claim 58, wherein the exhaust discharge from the cold spray compartment has a concentration of hydrogen chloride gas which is lower than about 5.0 parts per million.

60. A process as recited in claim 58, wherein the cold water effluent discharge from the cold spray compartment has a pH above about 6.0.

61. A process as recited in claim 58, wherein the metal precipitate is a tin oxide.

62. A process as recited in claim 55, wherein the metal halide comprises titanium tetrachloride.

63. A process as recited in claim 55, wherein the metal precipitate forms a slurry in the hot water collector.

64. A process as recited in claim 55, further comprising the steps of:
    discharging the cold water effluent from the cold spray compartment; and
    recycling the hot water in the hot water collector to the hot water spray.

65. A process as recited in claim 55, wherein an airborne tin concentration outside of a hot-end glass coating appratus is less than about 1.0 milligrams per cubic meter.

66. A process for treating an overspray gas generated during a hot-end glass coating operation utilizing an organo substituted metal halide, said process comprising the steps of:
    collecting the overspray gas;
    passing the overspray gas to a hot spray compartment;
    spraying the overspray gas with a hot water spray to decompose the organo substituted metal halide to a metal precipitate and a hydrogen halide;
    collecting the metal precipitate and the hot water spray in a warm water collector;
    passing a gaseous portion of hydrogen halide to a cold spray compartment;
    spraying the gaseous portion of hydrogen halide with a cold water spray to form an acid;
    collecting the acid to form a cold water effluent; and
    discharging an exhaust from the cold spray compartment.

67. A process as recited in claim 66, wherein the hot water is at a temperature greater than, about 160° F.

68. A process as recited in claim 67, wherein the cold water spray is at a temperature less than about 90° F.

69. A process as recited in claim 68, wherein the exhaust discharge from the cold spray compartment has a concentration of hydrogen chloride gas which is lower than about 5.0 parts per million.

70. A process as recited in claim 66, wherein the cold water effluent discharge from the cold spray compartment has a pH above about 6.0.

71. A process as recited in claim 66, wherein the metal precipitate forms a slurry in the hot water collector.

72. A process as recited in claim 66, further comprising the steps of:
    discharging the cold water effluent from the cold spray compartment; and
    recycling the hot water in the hot water collector to the hot water spray.

73. A process as recited in claim 66, wherein an airborne tin concentration outside of a hot-end glass coating apparatus is less than about 1.0 milligrams per cubic meter.

* * * * *